United States Patent
Huber

(10) Patent No.: US 9,079,510 B2
(45) Date of Patent: Jul. 14, 2015

(54) ADJUSTMENT DEVICE FOR ERGONOMICALLY SETTING A VEHICLE SEAT WITH SEVERAL ADJUSTABLE SEAT COMPONENTS

(71) Applicant: Bayerische Motoren Werke Aktiengesellschaft, Munich (DE)

(72) Inventor: Andreas Huber, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 53 days.

(21) Appl. No.: 13/646,134

(22) Filed: Oct. 5, 2012

(65) Prior Publication Data
US 2013/0090816 A1 Apr. 11, 2013

(30) Foreign Application Priority Data
Oct. 6, 2011 (DE) .......................... 10 2011 084 087

(51) Int. Cl.
*B60N 2/44* (2006.01)
*B60N 2/02* (2006.01)
*B60R 16/037* (2006.01)

(52) U.S. Cl.
CPC ............ *B60N 2/0248* (2013.01); *B60R 16/037* (2013.01)

(58) Field of Classification Search
CPC ............................. H04W 4/046; B60R 16/037
USPC ............................... 701/36, 49; 455/457, 566
See application file for complete search history.

(56) References Cited

U.S. PATENT DOCUMENTS

| 5,531,472 A | 7/1996 | Semchena et al. |
| 5,911,126 A * | 6/1999 | Massen .......................... 702/153 |
| 6,252,978 B1 | 6/2001 | Grantz |
| 2005/0232460 A1 | 10/2005 | Schmiz et al. |
| 2006/0140510 A1 | 6/2006 | Wallace et al. |
| 2006/0253241 A1 | 11/2006 | Bothe et al. |

(Continued)

FOREIGN PATENT DOCUMENTS

| DE | 44 14 216 C1 | 4/1995 |
| DE | 195 22 897 C2 | 7/1998 |

(Continued)

OTHER PUBLICATIONS

German Search Report dated Mar. 29, 2011 with partial English translation (nine (9) pages).

(Continued)

*Primary Examiner* — Redhwan K Mawari
*Assistant Examiner* — Rodney P King
(74) *Attorney, Agent, or Firm* — Crowell & Moring LLP

(57) ABSTRACT

An adjustment device has a control unit with a memory, in which vehicle occupant data is storable. The data enable an automatic setting of all adjustable seat components and/or vehicle components. A read-in unit allows the necessary vehicle occupant data to be read into the memory of the control unit from a mobile data medium. The data medium obtains the necessary vehicle occupant data as a defined two dimensional image from a digital image acquisition system. The control unit or the data medium has an algorithm that determines proportions of given body parts in relation to each other from the two dimensional image such that a certain, at least relative, automatic setting of the seat components and/or the vehicle components is derivable. An input unit, which is manually operable as a touch screen, sets defined body part positions using marks superposed in succession on the image.

9 Claims, 1 Drawing Sheet

(56) References Cited

U.S. PATENT DOCUMENTS

| | | |
|---|---|---|
| 2007/0043493 A1 | 2/2007 | Borke |
| 2007/0192038 A1 | 8/2007 | Kameyama |
| 2007/0236068 A1 | 10/2007 | Deissmann et al. |
| 2008/0276191 A1* | 11/2008 | Breed .......................... 715/771 |

FOREIGN PATENT DOCUMENTS

| | | |
|---|---|---|
| DE | 102 06 471 A1 | 8/2003 |
| DE | 103 05 341 A1 | 8/2004 |
| DE | 103 23 023 A1 | 10/2004 |
| DE | 103 41 375 B4 | 9/2005 |
| DE | 10 2004 015 047 A1 | 10/2005 |
| DE | 199 29 418 B4 | 10/2005 |
| DE | 196 17 405 B4 | 11/2005 |
| DE | 10 2007 005 627 A1 | 10/2007 |
| DE | 10 2007 051 543 A1 | 4/2009 |
| DE | 10 2005 060 054 B4 | 7/2009 |
| DE | 10 2008 019 731 A1 | 10/2009 |
| DE | 10 2010 028 580 A1 | 11/2011 |
| EP | 1 594 716 B1 | 5/2010 |
| EP | 1 497 160 B2 | 7/2010 |
| WO | WO 2005/092665 A1 | 10/2005 |

OTHER PUBLICATIONS

German Search Report dated May 21, 2012 with partial English translation (ten (10) pages).

German Office Action with Partial English Translation dated Jul. 24, 2013 (Nine (9) pages).

\* cited by examiner

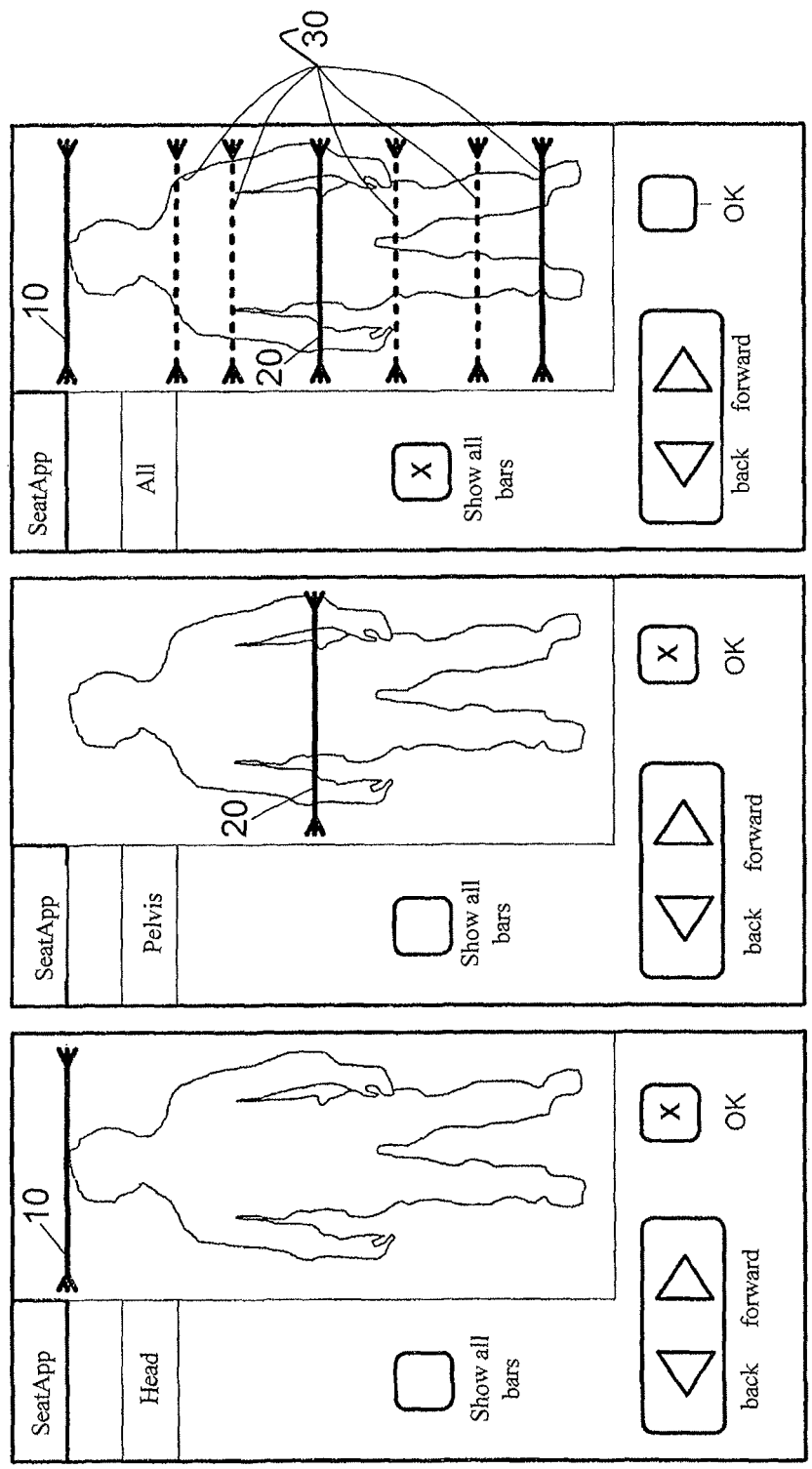

ADJUSTMENT DEVICE FOR ERGONOMICALLY SETTING A VEHICLE SEAT WITH SEVERAL ADJUSTABLE SEAT COMPONENTS

CROSS REFERENCE TO RELATED APPLICATION

This application claims priority under 35 U.S.C. §119 from German Patent Application No. 10 2011 084 087.7, filed Oct. 6, 2011, the entire disclosure of which is herein expressly incorporated by reference.

BACKGROUND AND SUMMARY OF THE INVENTION

The invention relates to an adjustment device for ergonomically setting a vehicle seat with several adjustable seat components and/or for ergonomically setting vehicle components that can be adjusted as a function of the position of the seat.

Such an adjustment device is known, for example, from the prior art German patent document DE 199 29 418 B4. In order to ergonomically set a vehicle seat with several adjustable seat components and/or in order to ergonomically set vehicle components (such as the inside mirror, the outside mirror or the steering wheel adjustment device) that are adjustable as a function of the position of the seat, the prior art adjustment device has a control unit for automatically setting at least one selection of the adjustable components as a function of the vehicle occupant data. The control unit has a memory, in which the vehicle occupant data, which are necessary for automatically setting all of the adjustable components, can be stored without the aid of sensors located inside the vehicle.

A selection, or all, of the adjustable components can be automatically set, as desired, as a function of the vehicle occupant data. The automatic setting can be initiated, for example, by actuating a single operator control element, which is provided for this purpose, or without actuating an operator control element in the case of an automatic identification, for example, by use of a personalized keyless entry remote. Preferably, the data of multiple vehicle occupants can be entered and selected by way of a single operator control element, for example, a key, a push-button, a rotary knob, or by way of a personalized keyless entry remote.

The adjustment device or, more specifically, the control unit has algorithms or empirically determined characteristic map data, by which the ergonomically optimal settings of the components are calculated from the vehicle occupant data. Then, the control unit actuates, as a function of the computer results, the actuators that are necessary for setting the respective components.

In a first alternative, the vehicle has preferably an input unit, which is to be operated manually and by which an operating person can enter the vehicle occupant data, such as the body height, knee height, hip joint height, shoulder height and the cervical vertebra length, into the memory of the control unit. For example, the input unit can be a keyboard, which is present in any event in the vehicle and which is a part of the on-board computer.

In a second alternative, the vehicle has preferably a read-in unit, by which the necessary vehicle occupant data can be read into the memory of the control unit from a data medium. The data medium can be, for example, a personalized vehicle key in the broadest sense (for example, also an identification card or a code transmitter), by which a wireless read-in by radio is possible. Given the expectation that a driver's own personalized key will be used, the correct set of vehicle occupant data is always activated automatically.

Preferably, the data medium obtains the necessary vehicle occupant data from a scanner system in order to optimize its accuracy; and the respective vehicle occupant was three dimensionally scanned by way of this scanner system. Such scanner systems are already used, for example, in the fashion industry.

Furthermore, mechanical and electric seat adjustment devices with a plurality of levers or switches that are to be operated for the seat components and setting options, such as the longitudinal and vertical adjustment of the seat cushions, inclination of the backrest and/or the entire seat, the position of the lumbar support, the height and inclination of the headrest, the width of the transverse side of the seat, the length of the leg support, etc., are well known. In order to reduce the complexity of the setting operations, electric seat adjustment devices have so-called memory switches, which usually allow one of two preprogrammable seat settings to be chosen with the actuation of only one switch, but first these seat settings have to have been set previously by hand by use of the plurality of switches.

The object of the present invention is to further improve an adjustment device of the type described at the outset in terms of a precise ergonomic setting of adjustable components and in terms of a reduction in the complexity of the setting operations.

This and other objects are achieved by an adjustment device for ergonomically setting a vehicle seat with adjustable seat components and/or for ergonomically setting vehicle components, which can be adjusted as a function of the position of the seat, with a control unit for automatically setting at least one selection of the seat components and/or the vehicle components as a function of the vehicle occupant data. The control unit has a memory, in which the vehicle occupant data or data derived therefrom can be stored. The data enable an automatic setting of the adjustable seat components and/or vehicle components. There is a read-in unit, by which the data can be read into the memory from a mobile data medium. The data medium obtains the vehicle occupant data in the form of a defined two dimensional image from a digital image acquisition system. The image is to be taken in a predefined way. An input unit, which is to be operated manually, is provided in the form of a touch screen, on which defined positions of body members can be set in a superposed manner on the image, shown on the touch screen, by way of at least one marking bar, which can be displaced on the display with a finger.

The invention constitutes a further development of the German patent document DE 10 2010 028 580, which was filed by the applicant here and which is not a prior publication. This document describes a simplification of the method for determining the necessary vehicle occupant data and is hereby incorporated by reference in its entirety. In this case, a simple two dimensional image acquisition system is used, in particular a device for creating or storing digital photos, which the vehicle occupant keeps close at hand. Especially advantageous are digital mobile terminal devices, such as mobile telephones with a photo function, portable digital cameras, PCs or laptops with attached Webcam or other digital storage devices with standardized interfaces (such as the iPod, iPad, iPhone or other multimedia units).

It is known to provide mobile terminal devices (like mobile telephones, digital cameras or other portable digital storage devices) with a Bluetooth or USB interface. Moreover, motor vehicles are already equipped with such standardized interfaces as a read-in unit for attachment for such devices. Other applicable standard interfaces as a read-in unit are, for example, the diagnostic interface, the Internet or WLAN.

The adjustment device according to the invention has, in particular, a control unit with a memory, in which vehicle occupant data can be stored; and these vehicle occupant data enable an automatic setting of all of the adjustable seat components and/or vehicle components. In this case, a read-in unit is provided, for example, in the form of a known standard interface, by which the necessary vehicle occupant data can be read into the memory of the control unit from a data medium that is located outside the vehicle or, respectively, from a mobile data medium. The data medium obtains at least the necessary vehicle occupant data in the form of a defined two dimensional image from a digital image acquisition system. The control unit is provided with an algorithm that is stored in the memory; and this algorithm determines the proportions of given body parts in relation to each other, in particular, from the two dimensional image in such a way that the results can be used to derive a defined, at least relative, automatic setting of the seat components and/or the vehicle components.

As an alternative to the control unit, the data medium, in particular the memory of a mobile terminal unit can comprise, in the form of an "App," the algorithm for determining the body proportions from the two dimensional image as well as comprise the algorithm, based on empirical findings, for the ergonomically optimal setting of the seat components and/or vehicle components. As a result, the desired positions of the components to be set are then transferred directly to the control unit by way of the data medium. The control unit stores, for example, the positions in the memory and then moves, if desired automatically, to these positions. This procedure makes it possible to implement the function in such a way that maintenance is easy.

Preferably, an input unit that is to be operated by hand is provided. Using this input unit, an operating person can store his height in the control unit or in the data medium. Then, the control unit or the data medium is programmed in such a way that in conjunction with the determined proportions a defined absolute automatic setting of the seat components and/or vehicle components can be derived.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 1A-1C illustrate an exemplary embodiment of the present invention showing three input functions on a touch screen.

DETAILED DESCRIPTION OF THE DRAWINGS

In a preferred exemplary embodiment, the digital image acquisition system is a camera functionality of a mobile terminal device, which can be connected to the control unit in the vehicle by way of a standard interface, such as, in particular, USB or Bluetooth. The data medium is a memory card of this mobile terminal device (for example, mobile telephone or, respectively, Smartphone).

The defined two dimensional image is to be taken in such a way that certain body parts can be recognized and can be logged at least in terms of their size relative to each other.

For example, the vehicle occupant can be photographed (preferably at the dealer) in front of a reference wall from a defined distance with a mobile camera phone. Then the photo, which was obtained in this way, the reference wall located behind and the distance can be used to determine automatically the body proportions, for example, the ratio of the legs to the upper torso. If desired, the photo, reference wall and distance can also be used to determine the absolute body height. If this is not the case, then the vehicle occupant can enter the body height manually into the control unit of the vehicle as additional information. With the data obtained in this way it is possible to automatically set an optimal seat position and, if desired, additional related or associated vehicle components (such as the inside mirror, the outside mirror or the steering wheel adjustment device) by use of empirically determined values.

As an alternative to an automatic contour recognition from the stored photo, for example, in front of a reference wall, an especially convenient possibility is a manual contour input based on a photo without a reference wall, in addition to the manual input of the body height. In this case an especially simple solution is to implement the contour input by way of an input unit that is to be operated by hand, wherein one or more bars, which can be displaced with a finger and which are superimposed on the photo or an additional two dimensional image of the occupant (for example, the outer contour of a person), are provided for identifying defined body parts.

In detail, and in reference to FIGS. 1A-1C, in order to implement this second alternative, in which the contours are identified by use of at least one bar which is to be superimposed on the photo and which can be moved with a finger, the invention provides that the input unit that is to be operated manually is a so-called touch screen (also called a touch sensitive screen, a touch activated screen or a sensor screen), as already known in conjunction with mobile terminal devices (mobile telephones, Smartphones or other digital mobile terminal devices having a camera function, such as "iPhone," "iPod touch," etc.).

Thus, the adjustment device according to the invention has a control unit with a memory, in which the vehicle occupant data can be stored; and these vehicle occupant data enable an automatic setting of all of the adjustable seat components and/or vehicle components. In this case a read-in unit is provided, for example, in the form of a known standard interface, by which the necessary vehicle occupant data can be read into the memory of the control unit from a mobile data medium. The data medium obtains the necessary vehicle occupant data in the form of a defined two dimensional image from a digital image acquisition system. The control unit or the data medium is provided with an algorithm that is stored in the memory; and this algorithm determines the proportions of given body parts in relation to each other from the two dimensional image in such a way that the results can be used to derive a defined, at least relative, automatic setting of the seat components and/or the vehicle components.

In this context, the defined two dimensional image is to be taken in such a way that certain body parts can be recognized. At the same time an input unit that is to be operated manually is provided in the form of a touch screen, on which defined positions of body parts are to be set in a superposed manner in succession on the image (in particular, the photo) shown on the touch screen by way of at least one marking bar that can be moved with a finger. The control unit and/or the data medium is (are) provided with an algorithm, which determines the proportions of given body parts in relation to each other from the image and from the positions identified by the marking bar on the image in such a way that the results can be used to derive a defined automatic setting of the seat components and/or the vehicle components.

Preferably in this case an application program (for example, an "App") for the mobile terminal device with the following functionality is provided.

The data medium is a memory of the mobile terminal device, which offers the application program for selection in conjunction with the seat setting.

After a start signal (which is initiated with just a touch in a manner known from the prior art) for executing the application program, the mobile terminal device prompts the user to take a two dimensional photo in a defined way (sitting or standing). In this case the aim 1s to recognize, in particular, predefined necessary body parts or more specifically contours.

After the photo has been taken (also by use of the mobile terminal device), this photo is displayed on the touch screen of the terminal device together with a prompt to position a first marking bar 10 (for example, for the head height) (see FIG. 1A).

After the user has entered the first marking bar 10, there follows a prompt to position a second marking bar 20 (for example, for the height of the pelvis) (see FIG. 1B) and also other marking bars 30 (see FIG. 1C).

Following input of all of the marking bars and a confirmation signal by the user, the data are stored in the data medium and/or transmitted at once over a suitable interface (for examples, see above) to the control device located inside the vehicle.

Then, the control device (as described in detail above) sets, as a function of the proportions calculated from the entered marking bars, in particular, the seat positions, the exterior mirror positions, the steering wheel position and/or the interior mirror position (in so far as they can be adjusted electrically).

An expansion of the application program allows other settings that depend on the seat position to be executed. For example, the following additional functions for selecting predefined standard positions can be provided on the screen:

setting of a "sleep position",
setting of a "clean position",
setting of a "child's seat installation position",
setting of one's own standard position,
superimposed setting based on vehicle character (sporty, comfortable . . . ),
help.

In addition to the recognition of the proportions by way of bars, an automatic recognition by way of image recognition algorithms is also contemplated (as already mentioned briefly above as the first alternative). When the user is taking a picture, the user can be assisted while taking the picture with graphics placed behind the camera screen. When the camera is in the correct orientation and the person is in the correct position, the picture can be taken automatically. The automatic proportion recognition by use of image recognition can be assisted in that the user indicates with his hand certain distinct proportion features, such as the hip bone or the pelvic bone, while taking the picture.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An adjustment device for ergonomically setting at least one of a vehicle seat having adjustable seat components and defined vehicle components adjustable as a function of a position of the vehicle seat, the adjustment device comprising:

a control unit operatively configured to automatically set at least one of a selection for an adjustable seat component and a selection for a defined vehicle component as a function of vehicle occupant data;

wherein the control unit includes a memory in which the vehicle occupant data or data derivable from the vehicle occupant data is storable, said data enabling an automatic setting of at least one of the components;

a read-in unit, by which the data is readable into the memory from a mobile data medium separate from the vehicle, the mobile data medium obtaining the vehicle occupant data in a form of a defined two dimensional image from a digital image acquisition system, the image being taken in a predefined way; and an input unit in a form of a manually operable touch screen on which defined positions of body parts are settable in a superposed manner on the defined two dimensional image shown on the touch screen via a user displaceable marking bar, wherein the control unit comprises an algorithm configured to output the automatic setting of the at least one of the components based on determining proportions of the body parts from the defined two-dimensional image vehicle occupant data.

2. The adjustment device according to claim 1, wherein the touch screen of the input unit is a touch screen of a mobile terminal device having a photo function for creating the two dimensional image by photographing.

3. The adjustment device according to claim 2, wherein the mobile terminal device is operatively configured to execute an application program that enables input of the positions of the body parts using one or more of the user displaceable marking bars on the two dimensional image on the touch screen.

4. The adjustment device according to claim 3, wherein the mobile terminal device further comprises an executable application program that enables the input of the positions of the body parts via an automatic image recognition on the two dimensional image.

5. The adjustment device according to claim 3, wherein the application program additionally enables a user to select one or more predefined standard positions.

6. The adjustment device according to claim 4, wherein the application program additionally enables a user to select one or more predefined standard positions.

7. A computer product, comprising:

a computer readable medium having stored thereon program code segments that:

display, on a touch screen, a two dimensional image of a person acquired via a camera of a mobile terminal device;

respond to a user input on the touch screen to move at least one marking bar positioned on the two dimensional image on the touch screen as a function of a position of a body part of the person; and calculate parameters of the person as a function of the two dimensional image and the at least one marking bar, said parameters being usable to ergonomically set at least one of a vehicle seat having at least one adjustable seat component and at least one vehicle component adjustable as a function of a position of the vehicle; and transfer said parameters of the person to a read-in unit of the vehicle.

8. The computer product according to claim 7, wherein the computer readable medium further comprises program code segments that:

perform automatic image recognition on the two dimensional image to determine one or more positions of the body parts of the person.

9. The computer product according to claim 8, wherein the computer readable medium further comprises program code segments that:

allow a selection of predefined standard positions.

* * * * *